US012211291B2

(12) United States Patent
Tanabe

(10) Patent No.: US 12,211,291 B2
(45) Date of Patent: Jan. 28, 2025

(54) APPARATUS, METHOD, AND COMPUTER PROGRAM FOR DETECTING LANE BOUNDARY

(71) Applicant: TOYOTA JIDOSHA KABUSHIKI KAISHA, Toyota (JP)

(72) Inventor: Ken Tanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 471 days.

(21) Appl. No.: 17/700,129

(22) Filed: Mar. 21, 2022

(65) Prior Publication Data

US 2022/0309805 A1 Sep. 29, 2022

(30) Foreign Application Priority Data

Mar. 24, 2021 (JP) .................................. 2021-049973

(51) Int. Cl.
*G06V 20/56* (2022.01)
*G06T 7/70* (2017.01)
(Continued)

(52) U.S. Cl.
CPC .............. *G06V 20/588* (2022.01); *G06T 7/70* (2017.01); *G06V 10/751* (2022.01); *G06V 10/764* (2022.01); *G06T 2207/30256* (2013.01)

(58) Field of Classification Search
CPC .. G06V 20/588; G06V 10/751; G06V 10/764; G06V 20/56; G06V 20/58;
(Continued)

(56) References Cited

U.S. PATENT DOCUMENTS 8,224,031 B2 * 7/2012 Saito .................... G06V 10/753
382/104
2010/0138115 A1 * 6/2010 Kageyama .......... B60R 21/0134
701/45

(Continued)

FOREIGN PATENT DOCUMENTS

CN 105893949 A * 8/2016
CN 110321855 A * 10/2019

(Continued)

OTHER PUBLICATIONS

Jau Woei Perng et al. "Development of an embedded road boundary detection system based on deep learning"; Nov. 23, 2018, Image and Vision Computing 100 (Year: 2018).*

(Continued)

*Primary Examiner* — Aaron W Carter
*Assistant Examiner* — Alejandro Hernandez
(74) *Attorney, Agent, or Firm* — Oliff PLC

(57) ABSTRACT

An apparatus for detecting a lane boundary includes one or more processors configured to: input an image representing a region around a vehicle into a classifier to identify the types of objects represented in respective pixels of the image, and detect a boundary of the travel lane by determining, for each of pixel lines in a direction crossing the travel lane in the image, whether the position corresponding to a pixel group including a predetermined number of contiguous pixels is inside the travel lane in order along a scanning direction from one end to the other end of the pixel line, depending on the order of the types of objects represented in the pixel group and the result of determination whether the position corresponding to the immediately preceding pixel group with respect to the scanning direction is inside the travel lane.

5 Claims, 7 Drawing Sheets

(51) Int. Cl.
*G06V 10/75* (2022.01)
*G06V 10/764* (2022.01)

(58) Field of Classification Search
CPC ........ G06V 20/64; G06V 20/55; G06V 20/50; G06T 7/70; G06T 2207/30256; G06T 2207/20081; G06T 7/00; G06T 7/11; G06T 7/10; G05D 1/0246; G05D 1/0251; G06K 9/00791; G06K 9/00798; G01C 21/3815
See application file for complete search history.

(56) References Cited

U.S. PATENT DOCUMENTS

| | | | | |
|---|---|---|---|---|
| 2013/0184976 | A1* | 7/2013 | Akiyama | B62D 15/025 |
| | | | | 701/116 |
| 2013/0218369 | A1* | 8/2013 | Yoshihama | B60W 30/08 |
| | | | | 701/1 |
| 2013/0345900 | A1* | 12/2013 | Usui | B60W 10/20 |
| | | | | 701/1 |
| 2017/0010618 | A1* | 1/2017 | Shashua | B60W 30/14 |
| 2018/0150700 | A1* | 5/2018 | Kaneko | B60W 30/12 |
| 2018/0204073 | A1* | 7/2018 | Kawano | B60W 30/12 |
| 2019/0080601 | A1* | 3/2019 | Kawabe | G06V 20/58 |
| 2019/0095722 | A1* | 3/2019 | Kang | G06V 20/588 |
| 2019/0135341 | A1* | 5/2019 | Kumano | G06T 7/90 |
| 2020/0151865 | A1* | 5/2020 | Sota | G06T 7/0002 |
| 2020/0172100 | A1* | 6/2020 | Kato | G08G 1/16 |
| 2020/0327338 | A1* | 10/2020 | Philion | G06T 7/73 |
| 2020/0406921 | A1* | 12/2020 | Hirano | B60W 30/12 |
| 2021/0042535 | A1* | 2/2021 | Abbott | G06V 20/588 |
| 2023/0384117 | A1* | 11/2023 | Margin | G06V 10/82 |
| 2024/0096109 | A1* | 3/2024 | Sharma | G06N 3/0464 |
| 2024/0135726 | A1* | 4/2024 | Kawashima | G06V 20/56 |

FOREIGN PATENT DOCUMENTS

| | | |
|---|---|---|
| JP | 2011-243161 A | 12/2011 |
| JP | 2017-010464 A | 1/2017 |
| JP | 2019-087134 A | 6/2019 |

OTHER PUBLICATIONS

David C. Andrade et al. "A Novel Strategy for Road Lane Detection and Tracking Based on a Vehicle's Forward Monocular Camera", Apr. 2019, IEEE Transaction on Intelligent Transportation Systems, vol. 20, No. 4 (Year: 2019).*

* cited by examiner

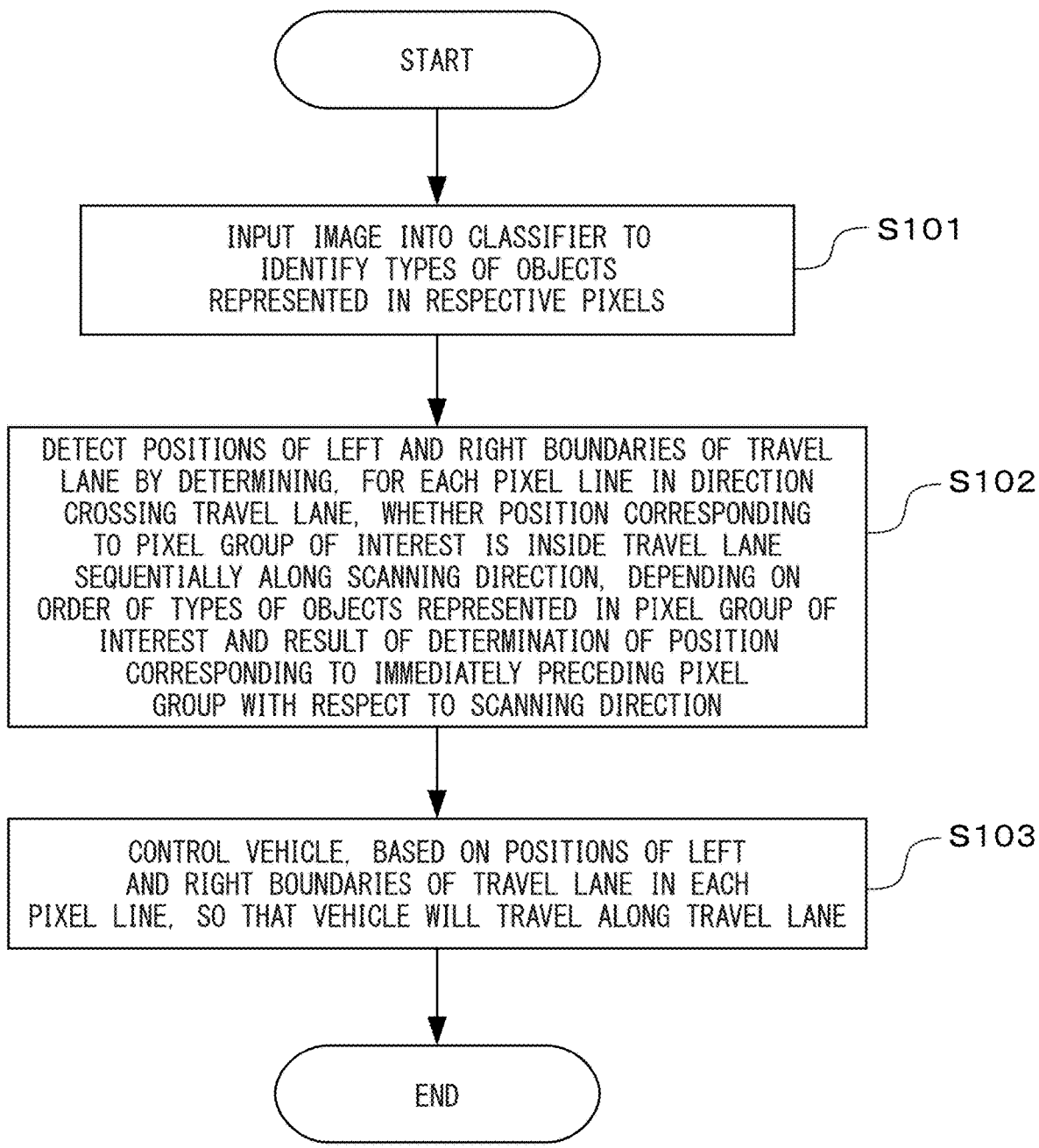

APPARATUS, METHOD, AND COMPUTER PROGRAM FOR DETECTING LANE BOUNDARY

FIELD

The present invention relates to an apparatus, a method, and a computer program for detecting a boundary of a lane represented in an image.

BACKGROUND

To control a vehicle for autonomous driving or assist a driver in driving a vehicle, it is desirable to correctly detect the positional relationship between the vehicle and the lane being traveled by the vehicle. Thus, the lane being traveled by a vehicle and its boundary lines are detected from an image of the surroundings of the vehicle obtained by a camera mounted on the vehicle (see Japanese Unexamined Patent Publication No. 2019-87134).

A driving support system disclosed in Japanese Unexamined Patent Publication No. 2019-87134 extracts edge points, based on luminance of pixels in a captured image. Of these edge points, an up-edge point is defined as a point such that the luminance of pixels is lower on the inside than on the outside, whereas a down-edge point is defined as a point such that the luminance of pixels is lower on the outside than on the inside. Of line candidates based on the positions of the edge points and excepting those which satisfy an exclusion condition, the system determines the lane candidate closest to the position of a vehicle as a lane boundary line. An example of the exclusion condition is that the number of edge points of an up-edge line forming a lane candidate is greater than that of a down-edge line by a predetermined point threshold or more.

SUMMARY

A lighter computational burden required for a process to detect the boundaries of the lane being traveled by a vehicle (hereafter, the "travel lane") from an image obtained by a camera mounted on the vehicle is preferred because hardware resources mounted on the vehicle are limited and used for various processes for autonomous driving control or driving assistance.

It is an object of the present invention to provide an apparatus that can reduce the computational burden required for a process to detect a boundary line of the travel lane of a vehicle from an image.

According to an embodiment, an apparatus for detecting a lane boundary is provided. The apparatus includes one or more processors configured to input an image representing a region around a vehicle into a classifier to identify the types of objects represented in respective pixels of the image. The image is obtained by a camera mounted on the vehicle, and the classifier has been trained to identify the type of object represented in each pixel. The types of objects at least include the type of object indicating the inside of a travel lane being traveled by the vehicle and the type of object indicating the outside of the travel lane. The processors are further configured to detect a boundary of the travel lane by determining, for each of pixel lines in a direction crossing the travel lane in the image, whether the position corresponding to a pixel group including a predetermined number of contiguous pixels is inside the travel lane in order along a scanning direction from one end to the other end of the pixel line, depending on the order of the types of objects represented in the pixel group and the result of determination whether the position corresponding to the immediately preceding pixel group with respect to the scanning direction is inside the travel lane.

When a plurality of sets of contiguous pixels inside the travel lane exists in one of the pixel lines, the processors of the apparatus preferably identify one of the sets of pixels most likely to be inside the travel lane as a lane region representing the travel lane, and detect, of two boundaries of the lane region in the scanning direction, a boundary such that no pixel representing the travel lane exists between an edge of the image and the boundary, as a boundary of the travel lane.

Preferably, the types of objects further include a different marking on a road different from a lane line; the type of object indicating the inside of the travel lane includes the travel lane; and the type of object indicating the outside of the travel lane includes a road surface different from the travel lane. For one of the pixel lines in the image corresponding to a position more than a predetermined distance away from the vehicle, the processors of the apparatus preferably determine that the position corresponding to a pixel group in which the identified types of objects are arranged in the order of the lane line, the different marking, and the travel lane from the side away from the vehicle represents a boundary of the travel lane. For one of the pixel lines in the image corresponding to a position within the predetermined distance of the vehicle, the processors preferably determine that the position of the travel lane represents a boundary of the travel lane when the identified types of objects are arranged in the order of the road surface or the lane line and then the travel lane from the side away from the vehicle.

According to another embodiment, a method for detecting a lane boundary is provided. The method includes inputting an image representing a region around a vehicle into a classifier to identify the types of objects represented in respective pixels of the image. The image is obtained by a camera mounted on the vehicle, and the classifier has been trained to identify the type of object represented in each pixel. The types of objects at least include the type of object indicating the inside of a travel lane being traveled by the vehicle and the type of object indicating the outside of the travel lane. The method further includes detecting a boundary of the travel lane by determining, for each of pixel lines in a direction crossing the travel lane in the image, whether the position corresponding to a pixel group including a predetermined number of contiguous pixels is inside the travel lane in order along a scanning direction from one end to the other end of the pixel line, depending on the order of the types of objects represented in the pixel group and the result of determination whether the position corresponding to the immediately preceding pixel group with respect to the scanning direction is inside the travel lane.

According to still another embodiment, a non-transitory recording medium that stores a computer program for detecting a lane boundary is provided. The computer program includes instructions causing a processor to execute a process including inputting an image representing a region around a vehicle into a classifier to identify the types of objects represented in respective pixels of the image. The image is obtained by a camera mounted on the vehicle, and the classifier has been trained to identify the type of object represented in each pixel. The types of objects at least include the type of object indicating the inside of a travel lane being traveled by the vehicle and the type of object indicating the outside of the travel lane. The process further includes detecting a boundary of the travel lane by determining, for each of pixel lines in a direction crossing the travel lane in the image, whether the position corresponding to a pixel group including a predetermined number of contiguous pixels is inside the travel lane in order along a scanning direction from one end to the other end of the pixel line, depending on the order of the types of objects represented in the pixel group and the result of determination whether the position corresponding to the immediately preceding pixel group with respect to the scanning direction is inside the travel lane.

The apparatus according to the present invention has an advantageous effect of being able to reduce the computational burden required for a process to detect a boundary line of the travel lane of a vehicle from an image.

BRIEF DESCRIPTION OF DRAWINGS

FIG. 8 is an operation flowchart of the vehicle control process including the boundary detection process.

DESCRIPTION OF EMBODIMENTS

An apparatus for detecting a lane boundary as well as a method and a computer program therefor executed by the apparatus will now be described with reference to the attached drawings. The apparatus inputs an image representing the surroundings of a vehicle into a classifier to identify the types of objects represented in respective pixels of the image. The image is obtained by a camera mounted on the vehicle, and the classifier has been trained to identify the type of object represented in each pixel. For each of pixel lines in a direction crossing the lengthwise direction of the travel lane in the image (hereafter simply a "direction crossing the travel lane"), the apparatus then determines whether the position corresponding to a pixel group including a predetermined number of contiguous pixels is inside the travel lane in order along a scanning direction from one end to the other end of the pixel line, depending on the order of the types of objects represented in the pixel group and the result of determination whether the position corresponding to the immediately preceding pixel group with respect to the scanning direction is inside the travel lane. The apparatus thereby detects the positions of the left and right boundaries of the travel lane viewed from the vehicle. In this way, the apparatus detects the positions of the boundaries of the travel lane by one scan per pixel line, aiming to reduce the computational burden. Additionally, the apparatus only has to scan along a particular direction (e.g., from left to right), and thus matches the order of pixels of the image stored in a memory with the scanning direction, aiming to improve the efficiency of memory access.

The following describes an example in which the apparatus for detecting a lane boundary is applied to a vehicle control system. In this example, the apparatus executes a boundary detection process on an image obtained by a camera mounted on a vehicle to detect the boundaries of the travel lane, and uses the result of detection for autonomous driving control of the vehicle.

Figure 1:
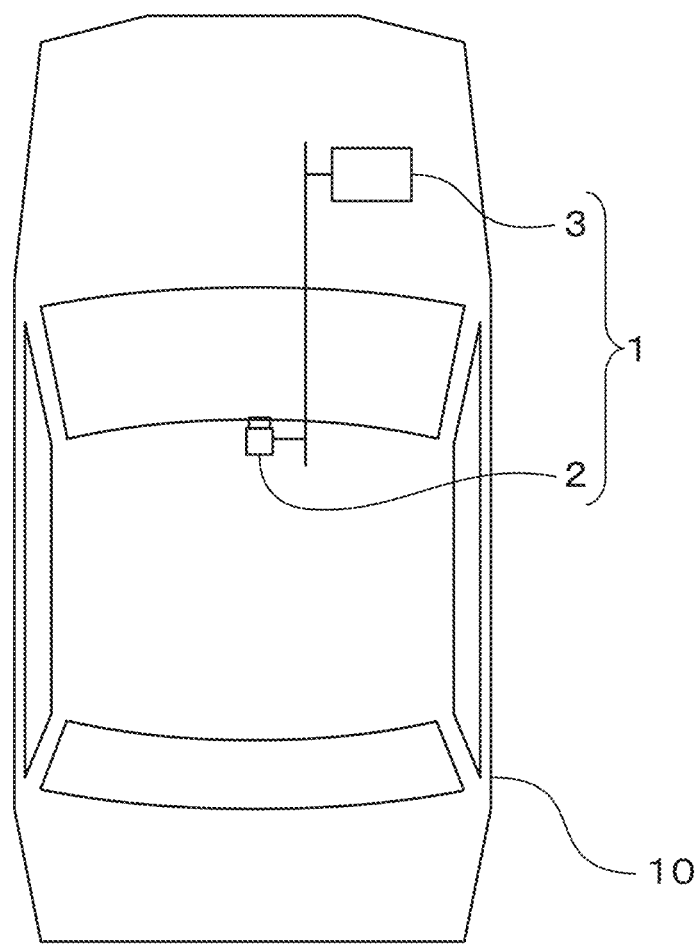
FIG. 1 schematically illustrates the configuration of a vehicle control system equipped with an apparatus for detecting a lane boundary.
Figure 2:
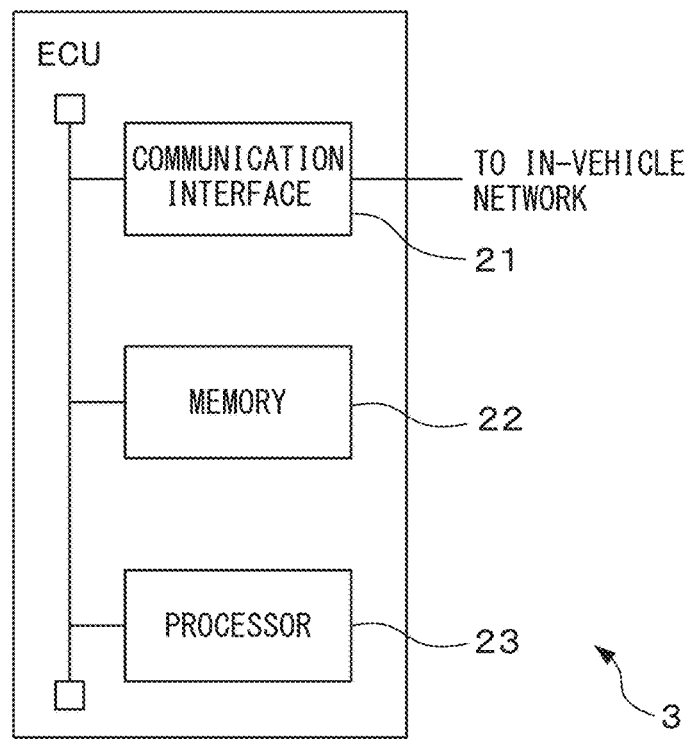
FIG. 2 illustrates the hardware configuration of an electronic control unit, which is an embodiment of the apparatus for detecting a lane boundary.

FIG. 1 schematically illustrates the configuration of a vehicle control system equipped with the apparatus for detecting a lane boundary. FIG. 2 illustrates the hardware configuration of an electronic control unit, which is an embodiment of the apparatus for detecting a lane boundary. In the present embodiment, the vehicle control system 1, which is mounted on a vehicle 10 and controls the vehicle 10, includes a camera 2 for capturing the road surface around the vehicle 10, and an electronic control unit (ECU) 3, which is an example of the apparatus for detecting a lane boundary. The camera 2 is connected to the ECU 3 via an in-vehicle network conforming to a standard, such as a controller area network, so that they can communicate with each other. The vehicle control system 1 may further include a storage device (not illustrated) that stores a map used for autonomous driving control of the vehicle 10. The vehicle control system 1 may further include a distance sensor (not illustrated), such as a LiDAR sensor or radar; a GPS receiver or another receiver (not illustrated) for determining the position of the vehicle 10 in conformity with a satellite positioning system; a wireless communication terminal (not illustrated) for wireless communication with another device; and a navigation device (not illustrated) for searching for a planned travel route of the vehicle 10.

The camera 2, which is an example of the image capturing unit that generates an image representing a region around the vehicle 10, includes a two-dimensional detector constructed from an array of optoelectronic transducers, such as CCD or C-MOS, having sensitivity to visible or infrared light and a focusing optical system that forms an image of a target region on the two-dimensional detector. The camera 2 is mounted, for example, in the interior of the vehicle 10 so as to be oriented to the front of the vehicle 10. The camera 2 captures a region including the road surface ahead of the vehicle 10 every predetermined capturing period (e.g., 1/30 to 1/10 seconds), and generates images representing this region. The images obtained by the camera 2 may be color or grayscale images. The vehicle control system 1 may include multiple cameras 2 taking pictures in different orientations or having different angles of view.

Whenever generating an image, the camera 2 outputs the generated image to the ECU 3 via the in-vehicle network.

The ECU 3 controls the vehicle 10. In the present embodiment, the ECU 3 detects the boundaries of the travel lane from time-series images obtained by the camera 2, and controls the vehicle 10 so that it will travel along the travel lane identified by the detected boundaries. To achieve this, the ECU 3 includes a communication interface 21, a memory 22, and a processor 23.

The communication interface 21, which is an example of a communication unit, includes an interface circuit for connecting the ECU 3 to the in-vehicle network. In other words, the communication interface 21 is connected to the camera 2 via the in-vehicle network. Whenever receiving an image from the camera 2, the communication interface 21 passes the received image to the processor 23. Additionally, the communication interface 21 passes a map read from the storage device and received via the in-vehicle network, positioning information received from the GPS receiver, and other information to the processor 23.

The memory 22, which is an example of a storage unit, includes, for example, volatile and nonvolatile semiconductor memories. The memory 22 stores a computer program for implementing various processes executed by the processor 23 of the ECU 3 as well as various types of data used in the boundary detection process, such as images received from the camera 2 and various parameters for specifying a classifier used in the boundary detection process. Additionally, the memory 22 stores the results of computation obtained during the boundary detection process.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit. Whenever receiving an image from the camera 2 during travel of the vehicle 10, the processor 23 executes a vehicle control process including the boundary detection process on the received image. The processor 23 controls the vehicle 10 to automatically drive the vehicle 10 or assist a driver of the vehicle 10 in driving, based on the detected boundaries of the travel lane.

Figure 3:
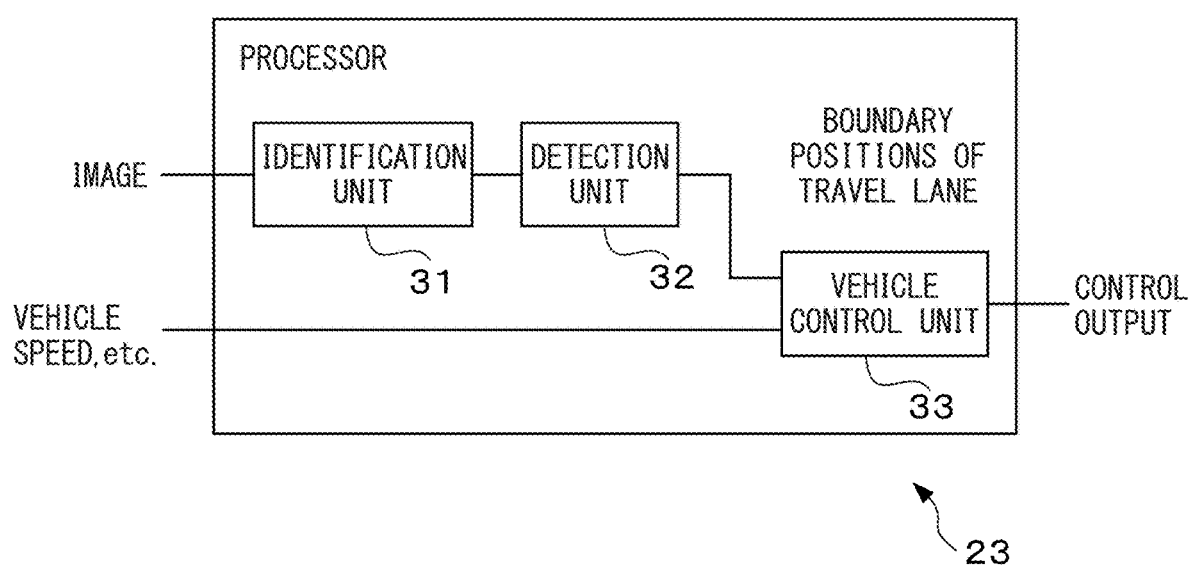
FIG. 3 is a functional block diagram of a processor of the electronic control unit, related to a vehicle control process including a boundary detection process.

FIG. 3 is a functional block diagram of the processor 23 of the ECU 3, related to the vehicle control process including the boundary detection process. The processor 23 includes an identification unit 31, a detection unit 32, and a vehicle control unit 33. These units included in the processor 23 are, for example, functional modules implemented by a computer program executed on the processor 23, or may be dedicated operating circuits provided on the processor 23. Of these units included in the processor 23, the identification unit 31 and the detection unit 32 execute the boundary detection process.

Whenever an image is obtained from the camera 2, the identification unit 31 inputs the image into a classifier that has been trained to identify the type of object represented in each pixel, thereby identifying the types of objects represented in respective pixels of the image.

In the present embodiment, the types of objects identified by the classifier are used for detecting the boundaries of the travel lane represented in the image; thus the types of objects to be identified at least include types indicating the inside of the travel lane and types indicating the outside of the travel lane. In the present embodiment, the types of objects indicating the inside of the travel lane include the travel lane itself. The types of objects indicating the outside of the travel lane include a stationary object, a road surface different from the travel lane (hereafter, a "different road surface"), and a lane line. Mark portions and portions between the marks of a broken lane line on a road surface (the latter portions will hereafter be referred to as "non-mark portions") may be separately identified. In the following description, mark portions and non-mark portions of a lane line will be collectively referred to as a lane line, unless otherwise specified. The types of objects to be identified by the classifier may further include a moving object or a different marking provided on a road surface along a lane line, such as a guiding lane marking or a deceleration marking.

For example, a neural network for semantic segmentation having a convolutional neural network architecture including multiple convolution layers, e.g., a fully convolutional network (FCN) or U-Net, is used as the classifier. The use of such a neural network as the classifier enables the identification unit 31 to relatively accurately identify the type of object represented in each pixel. As the classifier, one configured by a machine learning system different from a neural network, e.g., a classifier for semantic segmentation based on a random forest, may be used.

Figure 4:
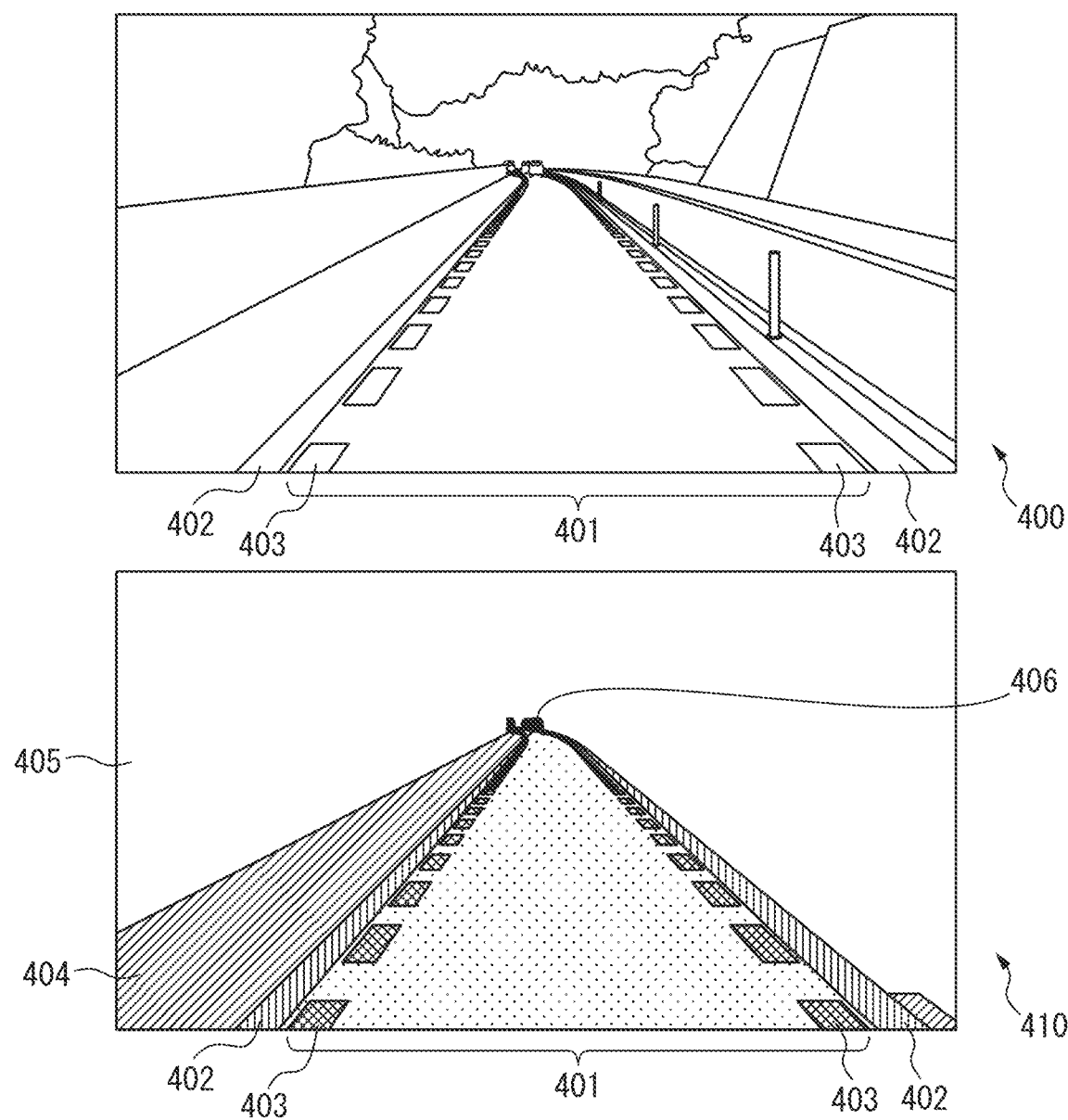
FIG. 4 illustrates an example of an image of the road surface ahead of a vehicle and the result of identification of the types of objects in respective pixels of the image.

FIG. 4 illustrates an example of an image of the road surface ahead of the vehicle 10 and the result of identification of the types of objects in respective pixels of the image. In the example illustrated in FIG. 4, the image 400 represents solid lane lines 402 and dotted guiding lane markings 403 on the left and right sides of a travel lane 401.

Thus, in the result 410 of identification regarding the pixels of the image 400, the pixels are classified into the travel lane 401, the lane lines 402, the different markings (guiding lane markings) 403, a different road surface 404, a stationary object 405, and a moving object 406. In this example, the lane opposite to the travel lane of the vehicle 10 is identified as the stationary object 405 rather than the different road surface 404.

The identification unit 31 notifies the result of identification regarding the pixels to the detection unit 32.

The detection unit 32 determines sets of pixels representing the left and right boundaries of the travel lane, based on the result of identification of objects in respective pixels. In the present embodiment, the detection unit 32 determines the edge of a lane line on the side of the travel lane as a boundary of the travel lane.

Suppose a process including, for each of pixel lines in a direction crossing the travel lane, setting a reference point inside the travel lane, scanning in a direction away from the reference point, and referring to the result of identification of objects in respective pixels to detect the position where a lane line first appears as a boundary of the travel lane. In this case, the computational burden will be heavy because each pixel line is scanned once to set a reference point and thereafter scanned again. Such a process involving multiple scans per pixel line to detect a boundary of the travel lane is not preferable. Additionally, if the scanning direction differs from the order of pixel values stored in the memory 22 or a cache memory of the processor 23, the efficiency will be low in terms of memory access.

Thus, for each of pixel lines in a direction crossing the travel lane in the image, the detection unit 32 sets a scanning direction from one end to the other end of the pixel line. The detection unit 32 then detects the left and right boundaries of the travel lane by determining, for each pixel line, whether the position corresponding to a pixel group including a predetermined number of contiguous pixels is inside the travel lane in order along the scanning direction, depending on the order of the types of objects represented in the pixel group and the result of determination whether the position corresponding to the immediately preceding pixel group with respect to the scanning direction is inside the travel lane.

In the present embodiment, since the lengthwise direction of the travel lane is the vertical direction in the image, the scanning direction is set as the horizontal direction so as to cross the lengthwise direction of the travel lane. Additionally, individual pixel values of each horizontal pixel line in the image are sequentially stored from the left end to the right. Thus, to improve the efficiency of memory access, the detection unit 32 sets a start point of a scan at the left end of each horizontal pixel line and scans each pixel line from the start point to the right. In the present embodiment, the detection unit 32 scans pixel groups each including two horizontally adjacent pixels in each pixel line to find out the order of the types of objects represented in each pixel group.

Figure 5:
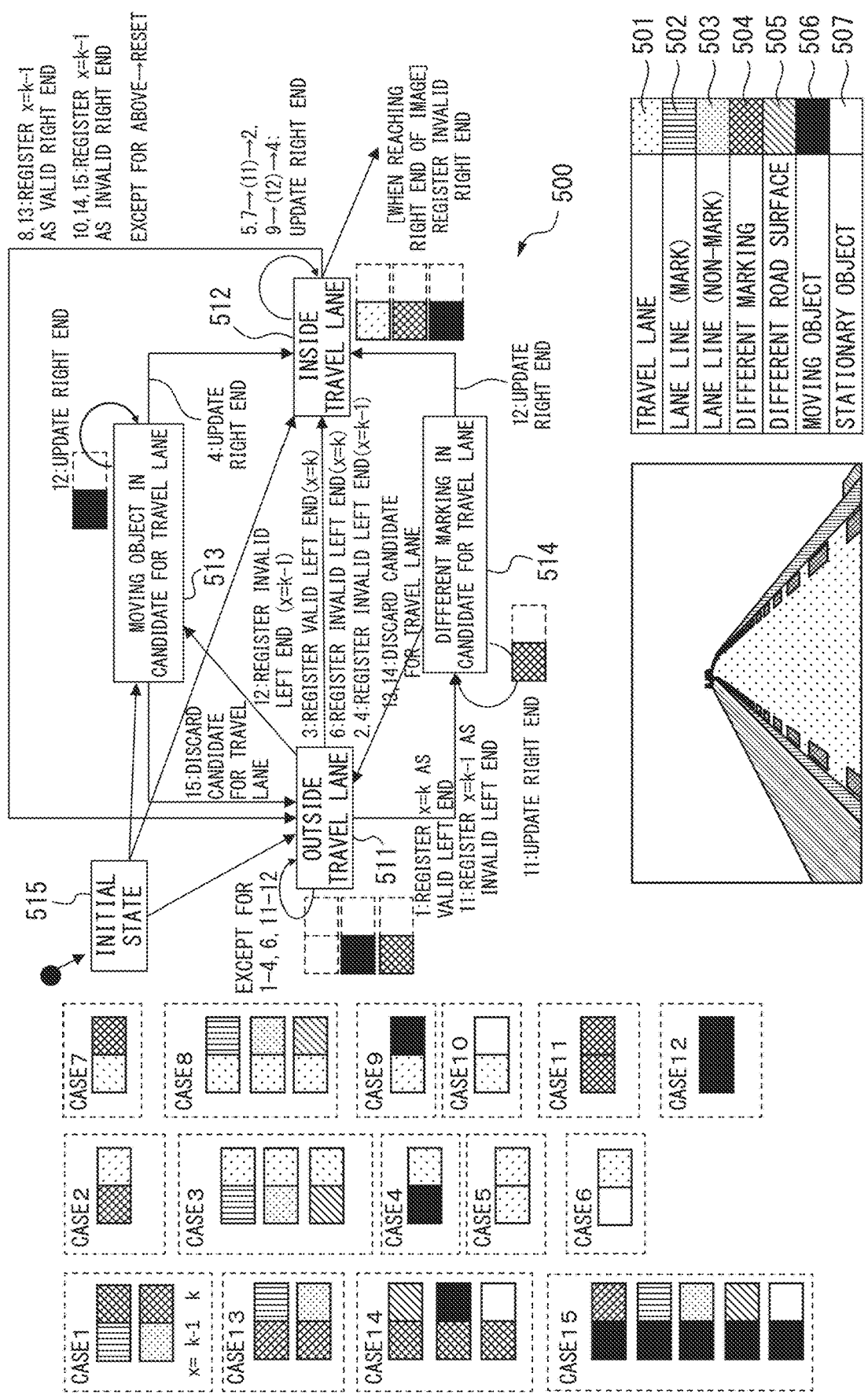
FIG. 5 is a state transition diagram indicating how the position corresponding to a pixel of interest in a scan transitions, based on the order of the types of objects in each pixel group.

FIG. 5 is a state transition diagram indicating how the position corresponding to a pixel of interest in a scan transitions, based on the order of the types of objects in each pixel group. In the present embodiment, the types of objects to be identified include seven types of objects: a travel lane 501, a mark portion 502 of a lane line, a non-mark portion 503 of a lane line, a different marking 504, a different road surface 505, a moving object 506, and a stationary object 507, as described above. Thus, of 49 possible orders of the types of objects in each pixel group, 27 orders focused on at detection of a boundary of the travel lane are classified into 15 cases of cases 1 to 15. For example, case 1 indicates that the left and right pixels of the pixel group correspond to a lane line and a different marking, respectively; case 13 indicates that the types of objects are arranged opposite to those in case 1. Case 2 indicates that the left and right pixels of the pixel group correspond to a different marking and the travel lane, respectively; case 7 indicates that the types of objects are arranged opposite to those in case 2. Case 3 indicates that the left pixel of the pixel group corresponds to a lane line or a different road surface and the right pixel to the travel lane; case 8 indicates that the types of objects are arranged opposite to those in case 3. Additionally, case 4 indicates that the left and right pixels of the pixel group correspond to a moving object and the travel lane, respectively; case 9 indicates that the types of objects are arranged opposite to those in case 4. Additionally, case 6 indicates that the left and right pixels of the pixel group correspond to a stationary object and the travel lane, respectively; case 10 indicates that the types of objects are arranged opposite to those in case 6. Additionally, cases 5, 11, and 12 indicate that every pixel of the pixel group is the travel lane, a different marking, and a moving object, respectively. Additionally, case 14 indicates that the left pixel of the pixel group corresponds to a different marking and the right pixel to a different road surface, a moving object, or a stationary object. In case 15, the left pixel of the pixel group corresponds to a moving object whereas the right pixel corresponds to an object that is neither moving object nor the travel lane.

The state transition diagram 500 includes five states 511 to 515. Of these, the state 511 indicates that a position of interest is outside the travel lane. The state 512 indicates that a position of interest is inside the travel lane. The state 513 indicates that a position of interest may be inside the travel lane and represents a moving object. Additionally, the state 514 indicates that a position of interest may be inside the travel lane and represents a different marking. The state 515 is an initial state of a scan, and indicates that a position of interest has not been identified whether it is inside or outside the travel lane. Each arrow between the states indicates a transition from the state at its origin to the state at its end; a number attached to each arrow indicates the case number (one of cases 1 to 15) of the pixel group to which the state transition is applied. The process associated with each case number is one to be executed together with the state transition when the types of objects in the pixel group of interest are arranged as indicated by the case number. Additionally, "right end" and "left end" mean the positions of the right and left boundary lines of the travel lane, respectively. Additionally, (k−1) and k indicate the positions corresponding to the left and right pixels of the pixel group of interest, respectively.

Upon starting a scan, the detection unit 32 sets the pixel group of interest so that the pixel of the left end, which is the start position of the scan, will be the position of interest and the left pixel of the pixel group of interest. The detection unit 32 then sets the state of the position of interest at one of the states 511 to 514 according to the type of object in the leftmost pixel. More specifically, when the type of object in the leftmost pixel is a stationary object, a different road surface, or a lane line, the detection unit 32 determines that the state of the position of interest is the state 511, i.e., outside the travel lane. When the type of object in the leftmost pixel is the travel lane, the detection unit 32 determines that the state of the position of interest is the state 512, i.e., inside the travel lane. When the type of the leftmost pixel is a moving object, the detection unit 32 determines that the state of the position of interest is the state 513, which indicates that the position of interest may be inside the travel lane and represents a moving object. In other words, the detection unit 32 determines the position of interest as that of a candidate for the inside of the travel lane. When the type of the leftmost pixel is a different marking, the detection unit 32 determines that the state of the position of interest is the state 514, which indicates that the position of interest may be inside the travel lane and represents a different marking. In this case also, the detection unit 32 determines the position of interest as that of a candidate for the inside of the travel lane.

Upon determining the state of the first position of interest, the detection unit 32 determines which of cases 1 to 15 the order of the types of objects in the pixel group of interest corresponds to. The detection unit 32 then refers to the state transition diagram 500 to change the state according to the order of the objects in the pixel group of interest in the state of the position of interest. For example, when the state of the position of interest is the state 511, i.e., outside the travel lane, and the order of the types of objects in the pixel group of interest corresponds to case 3, the type of object in the left pixel of the pixel group of interest is a lane line or a different road surface, and that in the right pixel of this pixel group is the travel lane. Hence the detection unit 32 sets the position of the right pixel of the pixel group of interest as a valid position of the left boundary of the travel lane, and changes the state to the state 512, i.e., inside the travel lane. When the state of the position of interest is the state 511, i.e., outside the travel lane, and the order of the types of objects in the pixel group of interest corresponds to case 6, the types of objects in the left and right pixels of the pixel group of interest are a stationary object and the travel lane, respectively. Thus the stationary object adjoins the travel lane in the pixel group of interest without a lane line or a different road surface in between. Hence the detection unit 32 sets the position of the right pixel of the pixel group of interest as an invalid position of the left boundary of the travel lane, and changes the state to the state 512, i.e., inside the travel lane. When the state of the position of interest is the state 513, i.e., possibly inside the travel lane, and the order of the types of objects in the pixel group of interest corresponds to case 15 (the object in the right pixel is neither moving object nor the travel lane), the position of interest should be outside the travel lane rather than inside the travel lane. Hence the detection unit 32 changes the state to the state 511, i.e., outside the travel lane, and discards the candidate for the travel lane set at the position of interest. Conversely, when the state of the position of interest is the state 513, i.e., possibly inside the travel lane, and the order of the types of objects in the pixel group of interest corresponds to case 4 (the object in the right pixel is the travel lane), the position of interest should be inside the travel lane. Hence the detection unit 32 changes the state to the state 512, i.e., inside the travel lane. Additionally, the detection unit 32 formally determines that the candidate for the travel lane set at the position of interest is inside the travel lane, and updates the assumed position of the right boundary of the travel lane to the position of the right pixel of the pixel group of interest. Similarly, when the state of the position of interest is the state 514, i.e., possibly inside the travel lane, and the order of the types of objects in the pixel group of interest corresponds to case 13 or 14, the position of interest should be outside the travel lane rather than inside the travel lane. Hence the detection unit 32 changes the state to the state 511, i.e., outside the travel lane, and discards the candidate for the travel lane set at the position of interest. Conversely, when the state of the position of interest is the state 514, i.e., possibly inside the travel lane, and the order of the types of objects in the pixel group of interest corresponds to case 2 (the object in the right pixel is the travel lane), the position of interest should be inside the travel lane. Hence the detection unit 32 changes the state to the state 512, i.e., inside the travel lane. Additionally, the detection unit 32 formally determines that the candidate for the travel lane set at the position of interest is inside the travel lane, and updates the assumed position of the right boundary of the travel lane to the position of the right pixel of the pixel group of interest. When the state of the position of interest is the state 512, i.e., inside the travel lane, and the order of the types of objects in the pixel group of interest corresponds to case 8 or 13 (the object in the right pixel is a lane line or a different road surface), the detection unit 32 sets the position of the left pixel of the pixel group of interest as a valid position of the right boundary of the travel lane, and changes the state to the state 511, i.e., outside the travel lane. When the state of the position of interest is the state 512, i.e., inside the travel lane, and the order of the types of objects in the pixel group of interest corresponds to case 10, 14, or 15, the detection unit 32 sets the position of the left pixel of the pixel group of interest as an invalid right boundary of the travel lane, and changes the state to the state 511, i.e., outside the travel lane. Regarding other combinations of the state of the position of interest and the order of objects in the pixel group of interest, state transitions occur according to the state transition diagram 500.

Thereafter, while shifting the position of interest to the right pixel by pixel, the detection unit 32 similarly sets the pixel group of interest whose left pixel is the position of interest, and changes the state of the position of interest according to the state transition diagram 500, based on the current state of the position of interest and the order of the types of objects in the pixel group of interest. When the position of interest reaches the right end of the pixel line being scanned, the detection unit 32 detects the validly registered position of the left boundary of the travel lane, if any, as the position thereof in this pixel line. Similarly, the detection unit 32 detects the validly registered position of the right boundary of the travel lane, if any, as the position thereof in this pixel line. In the case that the position of the left boundary of the travel lane is not validly registered and is only invalidly registered when the position of interest reaches the right end of the pixel line being scanned, the detection unit 32 does not detect the left boundary of the travel lane in this pixel line. Similarly, in the case that the position of the right boundary of the travel lane is not validly registered and is only invalidly registered when the position of interest reaches the right end of the pixel line being scanned, the detection unit 32 does not detect the right boundary of the travel lane in this pixel line.

In this way, the detection unit 32 can detect the left and right boundaries of the travel lane by only one scan per pixel line.

When a lane line and a different marking parallel thereto, such as a guiding lane marking, are provided, they do not adjoin, and thus in the image also, pixels representing the travel lane should exist between pixels representing the lane line and pixels representing the different marking. However, an object farther from the vehicle 10 or the camera 2 is represented smaller in the image. Thus, in the region in the image corresponding to the position on the road surface a certain distance or more away from the vehicle 10, it may be difficult to identify the portion of the road surface of the travel lane between the lane line and the different marking, and a pixel representing the lane line may adjoin a pixel representing the different marking. Thus, for a pixel line in the image corresponding to a position a predetermined distance or more away from the vehicle 10, the detection unit 32 may detect the position of the different marking as a boundary of the travel lane when the identified types of objects in respective pixels are arranged in the order of the lane line, the different marking, and the travel lane from the side away from the vehicle 10, as in case 1 or 13 illustrated in FIG. 5. For example, the predetermined distance may be such that the resolution of images obtained by the camera 2 will hinder identification of the road surface of the travel lane between a lane line and a different marking in the images.

Figure 6:
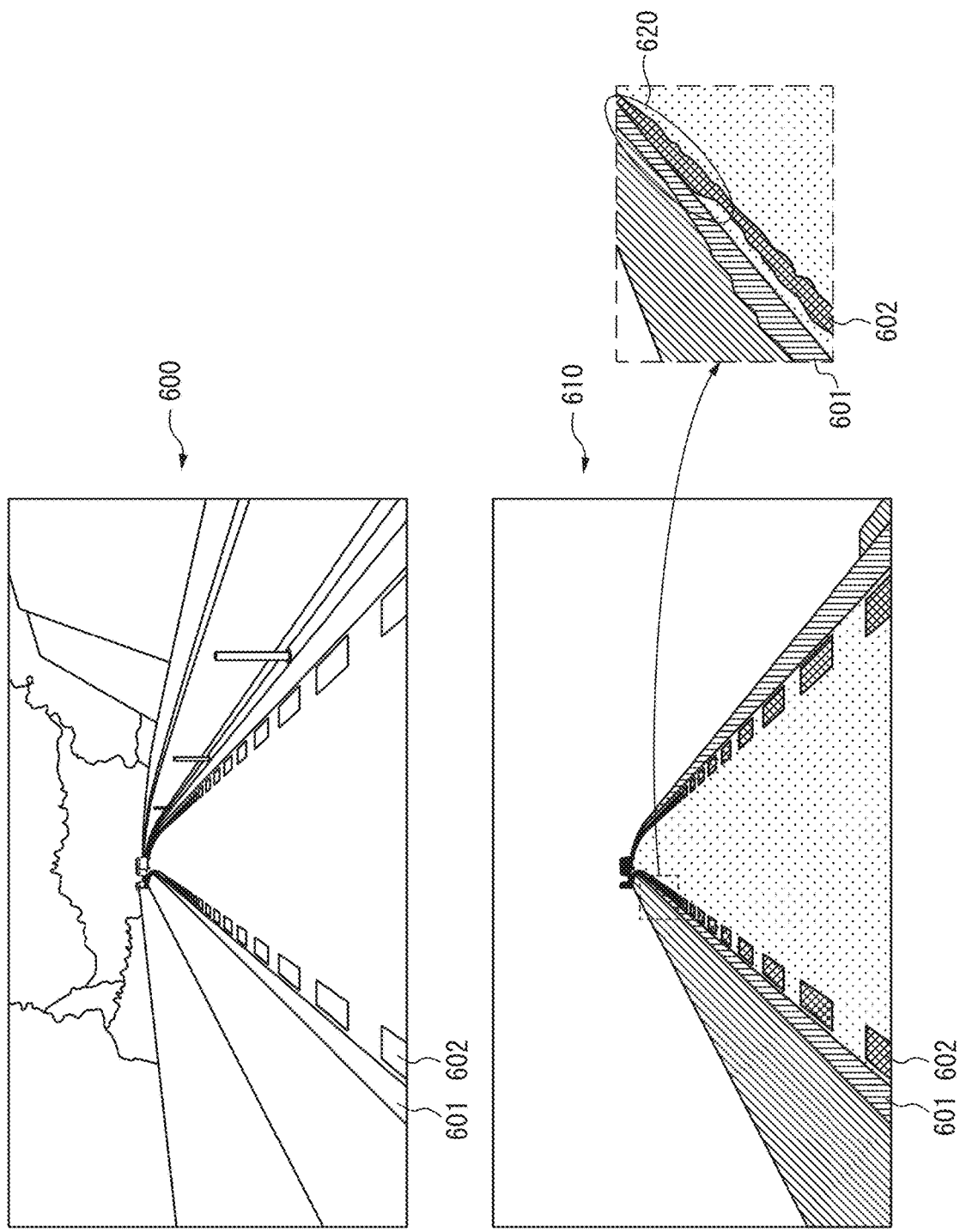
FIG. 6 illustrates an example of an image representing a lane line and a different marking.

FIG. 6 illustrates an example of an image representing a lane line and a different marking. As illustrated in FIG. 6, the image 600 represents a guiding lane marking 602 along a lane line 601 with a certain interval in between. However, in the result 610 of identification of the types of objects in respective pixels in the image 600, the pixel group representing the lane line 601 adjoins the pixel group representing the guiding lane marking 602 at the position corresponding to a region 620 because it is too far from the vehicle 10. Even in the region 620, the detection unit 32 can correctly detect a boundary of the travel lane by detecting, as described above, the position of the different marking as that of a boundary of the travel lane when the identified types of objects in respective pixels are arranged in the order of the lane line, the different marking, and the travel lane, i.e., when the lane line adjoins the different marking. For this reason, the detection unit 32 can detect a boundary of the travel lane from the vehicle 10 to a farther position. Additionally, at a position not very far from the vehicle 10, the detection unit 32 determines the position of the travel lane in a pixel line where the lane line or the different road surface and then the travel lane are arranged in this order from the side away from the vehicle as a boundary of the travel lane, as described above. Thus, even if a different marking, such as a guiding lane marking, is provided along a lane line, the detection unit 32 can prevent the boundary between the different marking and the travel lane from being erroneously detected as the real boundary of the travel lane.

A lane line or a different marking, such as a guiding lane marking, may be blurred, depending on the state of the surface of the road being traveled by the vehicle 10. In such a case, the accuracy of identification of the types of objects in respective pixels by the classifier may be low.

Figure 7:
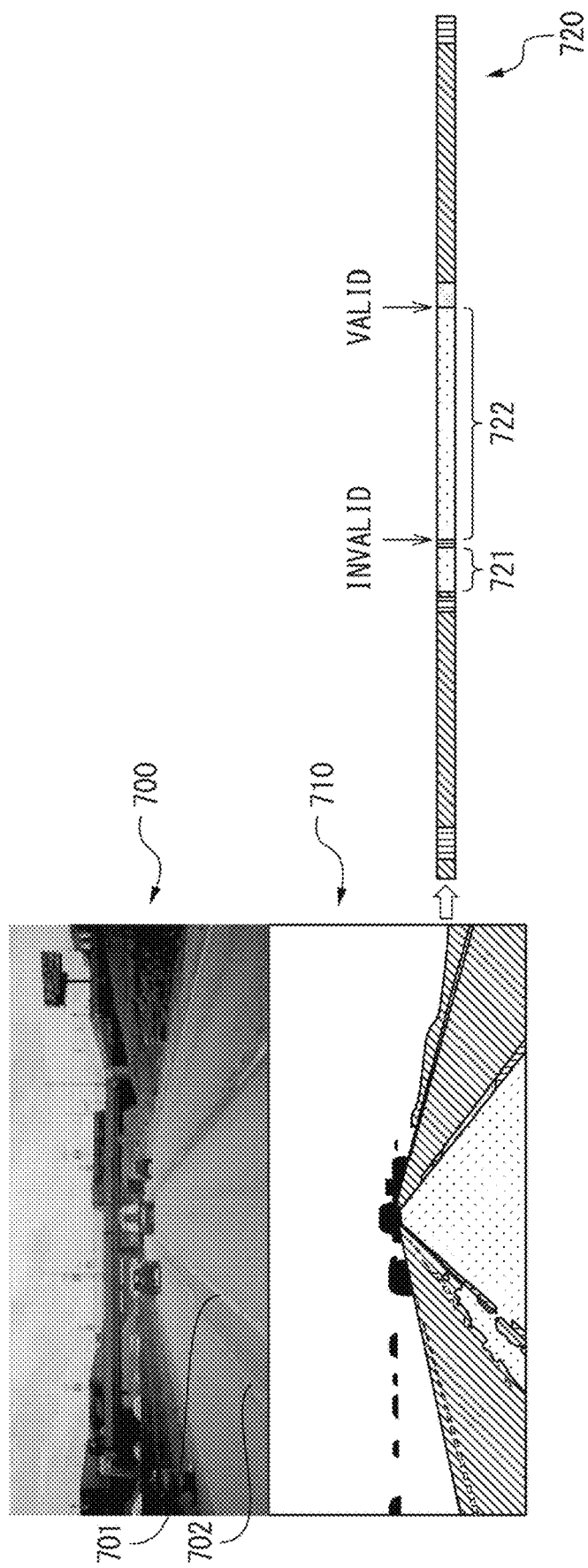
FIG. 7 illustrates an example of an image of a road with a blurred lane line and the result of identification of the types of objects in respective pixels.

FIG. 7 illustrates an example of an image of a road with a blurred lane line and the result of identification of the types of objects in respective pixels. In the road represented in the image 700, a lane line 701 and a different marking 702 are blurred. For this reason, the result 710 of identification of the types of objects in respective pixels in the image 700 includes pixels representing the different marking 702 but erroneously identified as those representing the lane line, and pixels representing a different road surface but erroneously identified as those representing the travel lane. In such a case, the position of a boundary line of the travel lane may also be erroneously detected. In particular, if pixels included in a region adjacent to the travel lane with a lane line in between are erroneously identified as those representing the travel lane, multiple regions determined as the inside of the travel lane (hereafter, "lane regions") may be detected in a pixel line.

Thus, in a pixel line from which multiple lane regions are detected as a result of a scan, the detection unit 32 selects the most reliable one of the lane regions. Of the left and right endpoints of the selected lane region, the detection unit 32 detects one on whose side no adjacent lane region exists between an edge of the image and the selected lane region as a valid boundary of the travel lane, and detects the other on whose side an adjacent lane region exists between the opposite edge of the image and the selected lane region as an invalid boundary of the travel lane. For example, the detection unit 32 determines a wider lane region as a more reliable one. For example, in a pixel line 720 illustrated in FIG. 7, two lane regions 721 and 722 are detected; of these, the right lane region 722 is wider than the left lane region 721. Hence the right lane region 722 is selected. Since no lane region exists on the right of the lane region 722, the right endpoint of the lane region 722 is detected as a valid position of a boundary of the travel lane. In contrast, since the other lane region 721 exists on the left of the lane region 722, the left endpoint of the lane region 722 is determined as an invalid boundary. In this way, the detection unit 32 can prevent erroneous detection of the position of a boundary of the travel lane even if a lane line or other markings represented in the image are blurred.

According to a modified example, in a pixel line from which multiple lane regions are detected in the latest image, the detection unit 32 may determine one of the lane regions such that the difference between this lane region and a lane region in the pixel line in the immediately preceding image closest to the former pixel line is the smallest, as the most reliable lane region. Alternatively, when multiple sets of contiguous pixels are inside the travel lane, the detection unit 32 may combine these sets of pixels into one and determine the left and right endpoints of the combined lane region as the positions of the boundaries of the travel lane.

The detection unit 32 notifies the vehicle control unit 33 of the detected valid positions of the boundaries of the travel lane for each pixel line.

The vehicle control unit 33 controls travel of the vehicle 10, based on the positions of the boundaries of the travel lane detected for each pixel line. For example, the vehicle control unit 33 generates a planned trajectory of the vehicle 10 in a predetermined section from the current position of the vehicle 10 to a predetermined distance away, based on the positions of the left and right boundaries of the travel lane detected for each pixel line, so that the vehicle 10 will travel on the center of the travel lane. To this end, the vehicle control unit 33 determines an approximate line obtained by applying, for example, the least-squares method to the set of pixels representing the left boundary of the travel lane, as the left boundary line of the travel lane. Similarly, the vehicle control unit 33 determines an approximate line obtained by applying, for example, the least-squares method to the set of pixels representing the right boundary of the travel lane, as the right boundary line of the travel lane. The position of each pixel in an image obtained by the camera 2 corresponds to the direction to an object represented in the pixel viewed from the camera 2. Thus the vehicle control unit 33 sets a planned trajectory so that the position in the image corresponding to the center line along the travel direction of the vehicle 10 will be equidistant from the left and right boundary lines of the travel lane. The vehicle control unit 33 then controls components of the vehicle 10 so that the vehicle 10 will travel along the planned trajectory. For example, the vehicle control unit 33 determines the steering angle for the vehicle 10 to travel along the planned trajectory, and outputs a control signal depending on the steering angle to an actuator (not illustrated) that controls the steering wheel of the vehicle 10. Additionally, the vehicle control unit 33 determines the acceleration of the vehicle 10, based on the current speed of the vehicle 10 measured by a vehicle speed sensor (not illustrated) or the acceleration of the vehicle 10 measured by an acceleration sensor (not illustrated), so that the vehicle 10 will travel while keeping a speed designated by the driver, a speed set according to the legally permitted speed of the road being traveled by the vehicle 10, or the distance between the vehicle 10 and a leading vehicle constant. The vehicle control unit 33 sets the degree of accelerator opening or the amount of braking so that the acceleration of the vehicle 10 will be equal to the determined acceleration. The vehicle control unit 33 then determines the amount of fuel injection according to the set degree of accelerator opening, and outputs a control signal depending on the amount of fuel injection to a fuel injector of the engine of the vehicle 10. Alternatively, the vehicle control unit 33 outputs a control signal depending on the set amount of braking to the brake of the vehicle 10.

FIG. 8 is an operation flowchart of the vehicle control process including the boundary detection process and executed by the processor 23. Whenever receiving an image from the camera 2, the processor 23 executes the vehicle control process in accordance with the operation flowchart illustrated in FIG. 8. In the operation flowchart described below, the process of steps S101 and S102 corresponds to the boundary detection process.

The identification unit 31 of the processor 23 inputs an image into a classifier to identify the types of objects represented in respective pixels of the image (step S101).

The detection unit 32 of the processor 23 detects the positions of the left and right boundaries of the travel lane by determining, for each of pixel lines in a direction crossing the travel lane in the image, whether the position corresponding to a pixel group of interest including a predetermined number of contiguous pixels is inside the travel lane in order along a scanning direction from one end to the other end of the pixel line, depending on the order of the types of objects represented in the pixel group of interest and the result of determination whether the position corresponding to the immediately preceding pixel group with respect to the scanning direction is inside the travel lane (step S102).

The vehicle control unit 33 of the processor 23 controls the vehicle 10, based on the positions of the left and right boundaries of the travel lane detected in each pixel line, so that the vehicle 10 will travel along the travel lane (step S103). The processor 23 then terminates the vehicle control process.

As has been described above, the apparatus for detecting a lane boundary inputs an image into a classifier that has been trained to identify the type of object represented in each pixel, thereby identifying the types of objects represented in respective pixels. The apparatus then detects the positions of the left and right boundaries of the travel lane by determining, for each of pixel lines in a direction crossing the travel lane, whether the position corresponding to a pixel group of interest including a predetermined number of contiguous pixels is inside the travel lane in order along a scanning direction from one end to the other end of the pixel line, depending on the order of the types of objects represented in the pixel group of interest and the result of determination whether the position corresponding to the immediately preceding pixel group with respect to the scanning direction is inside the travel lane. In this way, the apparatus can detect the boundaries of the travel lane by one scan per pixel line, reducing the computational burden. Additionally, the apparatus only has to scan each pixel line along a particular direction, and thus can match the order of pixels of the image stored in the memory with the scanning direction, improving the efficiency of memory access.

According to a modified example, when the positions of a boundary of the travel lane are separated a predetermined distance or more between adjoining pixel lines in the same image, the detection unit 32 may determine that the position of the boundary of the travel lane in one of the pixel lines is invalid. For example, when two pixel lines between which the positions of a boundary of the travel lane are separated a predetermined distance or more are detected, the detection unit 32 may determine that the position of the boundary in the pixel line corresponding to the position farther from the vehicle 10 is invalid. Alternatively, when the positions of a boundary of the travel lane between pixel lines at the same position in two sequential images are separated a predetermined distance or more, the detection unit 32 may also determine that the position of the boundary of the travel lane in the pixel line of the newer image is invalid.

A computer program for achieving the functions of the units of the processor 23 of the apparatus according to the embodiment may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for detecting a lane boundary, comprising:
    one or more processors configured to:
        input an image representing a region around a vehicle into a classifier to identify types of objects represented in respective pixels of the image, the image being obtained by a camera mounted on the vehicle, the classifier having been trained to identify the type of object represented in each pixel, the types of objects at least including a first type of object indicating an inside of a travel lane that is being traveled in by the vehicle and a second type of object indicating an outside of the travel lane, and
        detect a boundary of the travel lane in which the vehicle is travelling by, for each of a plurality of pixel lines that extend in a direction crossing the travel lane in the image, scanning the pixel line in a scanning direction starting from a first end of the pixel line and ending at a second end of the pixel line, the second end opposite the first end, the scanning including:
            (a) setting a pixel group of interest, the pixel group of interest including a predetermined number (the predetermined number being at least two) of contiguous pixels of the pixel line,
            (b) determining whether a position of the pixel group of interest is inside the travel lane based on (1) an order of the types of objects represented by the pixels included in the pixel group of interest and (2) a result of determining whether the position corresponding to an immediately preceding pixel group of interest with respect to the scanning direction is inside the travel lane,
            (c) re-setting the pixel group of interest by (i) removing at least one pixel located at a first-end side of the pixel group of interest from the pixel group of interest and (ii) adding at least one pixel located adjacent to a second-end-side of the pixel group of interest to the pixel group of interest,
            (d) repeating (b) and (c) until the second end of the pixel line is reached, and
            (e) determining whether any of the positions of the pixel groups of interest have been detected as a boundary of the travel lane.

2. The apparatus according to claim 1, wherein when a plurality of distinct sets of contiguous pixels inside the travel lane exists in one of the pixel lines, the one or more processors identify one of the plurality of sets of contiguous pixels as a lane region representing the travel lane, and detect, one of two boundaries of the lane region in the scanning direction to be the boundary of the travel lane, the one boundary being the boundary, of the two boundaries of the lane region, for which no pixel representing the travel lane exists between an edge of the image and the boundary.

3. The apparatus according to claim 1, wherein
    the types of objects further include a different marking on a road different from a lane line; the first type of object indicating the inside of the travel lane includes the travel lane; and the second type of object indicating the outside of the travel lane includes a road surface different from the travel lane;
    for one of the pixel lines in the image corresponding to a position more than a predetermined distance away from the vehicle, the one or more processors determine that the position of the different marking represents the boundary of the travel lane when the types of objects are arranged in the order of (i) the lane line, (ii) the different marking, and (iii) the travel lane from the side away from the vehicle; and
    for one of the pixel lines in the image corresponding to a position within the predetermined distance of the vehicle, the one or more processors determine that the position of the travel lane represents the boundary of the travel lane when the types of objects are arranged in the order of (a) the road surface or the lane line and then (b) the travel lane from the side away from the vehicle.

4. A method for detecting a lane boundary, the method comprising:
    inputting an image representing a region around a vehicle into a classifier to identify types of objects represented in respective pixels of the image, the image being obtained by a camera mounted on the vehicle, the classifier having been trained to identify the type of object represented in each pixel, the types of objects at least including a first type of object indicating an inside of a travel lane that is being traveled in by the vehicle and a second type of object indicating an outside of the travel lane; and
    detecting a boundary of the travel lane in which the vehicle is travelling by, for each of a plurality of pixel lines that extend in a direction crossing the travel lane in the image, scanning the pixel line in a scanning direction starting from a first end of the pixel line and ending at a second end of the pixel line, the second end opposite the first end, the scanning including:
- (a) setting a pixel group of interest, the pixel group of interest including a predetermined number (the predetermined number being at least two) of contiguous pixels of the pixel line,
- (b) determining whether a position of the pixel group of interest is inside the travel lane based on (1) an order of the types of objects represented by the pixels included in the pixel group of interest and (2) a result of determining whether the position corresponding to an immediately preceding pixel group of interest with respect to the scanning direction is inside the travel lane,
- (c) re-setting the pixel group of interest by (i) removing at least one pixel located at a first-end side of the pixel group of interest from the pixel group of interest and (ii) adding at least one pixel located adjacent to a second-end-side of the pixel group of interest to the pixel group of interest,
- (d) repeating (b) and (c) until the second end of the pixel line is reached, and
- (e) determining whether any of the positions of the pixel groups of interest have been detected as a boundary of the travel lane.

5. A non-transitory recording medium that stores a computer program for detecting a lane boundary, the computer program causing a processor to execute a process comprising:

inputting an image representing a region around a vehicle into a classifier to identify types of objects represented in respective pixels of the image, the image being obtained by a camera mounted on the vehicle, the classifier having been trained to identify the type of object represented in each pixel, the types of objects at least including a first type of object indicating an inside of a travel lane that is being traveled in by the vehicle and a second type of object indicating an outside of the travel lane; and detecting a boundary of the travel lane in which the vehicle is travelling by, for each of a plurality of pixel lines that extend in a direction crossing the travel lane in the image, scanning the pixel line in a scanning direction starting from a first end of the pixel line and ending at a second end of the pixel line, the second end opposite the first end, the scanning including:
- (a) setting a pixel group of interest, the pixel group of interest including a predetermined number (the predetermined number being at least two) of contiguous pixels of the pixel line,
- (b) determining whether a position of the pixel group of interest is inside the travel lane based on (1) an order of the types of objects represented by the pixels included in the pixel group of interest and (2) a result of determining whether the position corresponding to an immediately preceding pixel group of interest with respect to the scanning direction is inside the travel lane,
- (c) re-setting the pixel group of interest by (i) removing at least one pixel located at a first-end side of the pixel group of interest from the pixel group of interest and (ii) adding at least one pixel located adjacent to a second-end-side of the pixel group of interest to the pixel group of interest,
- (d) repeating (b) and (c) until the second end of the pixel line is reached, and
- (e) determining whether any of the positions of the pixel groups of interest have been detected as a boundary of the travel lane.

* * * * *